Aug. 1, 1950     C. R. HOLCOMB ET AL     2,517,314
SIGNALING DEVICE FOR AUTOMOBILES
Filed July 31, 1948     2 Sheets-Sheet 1
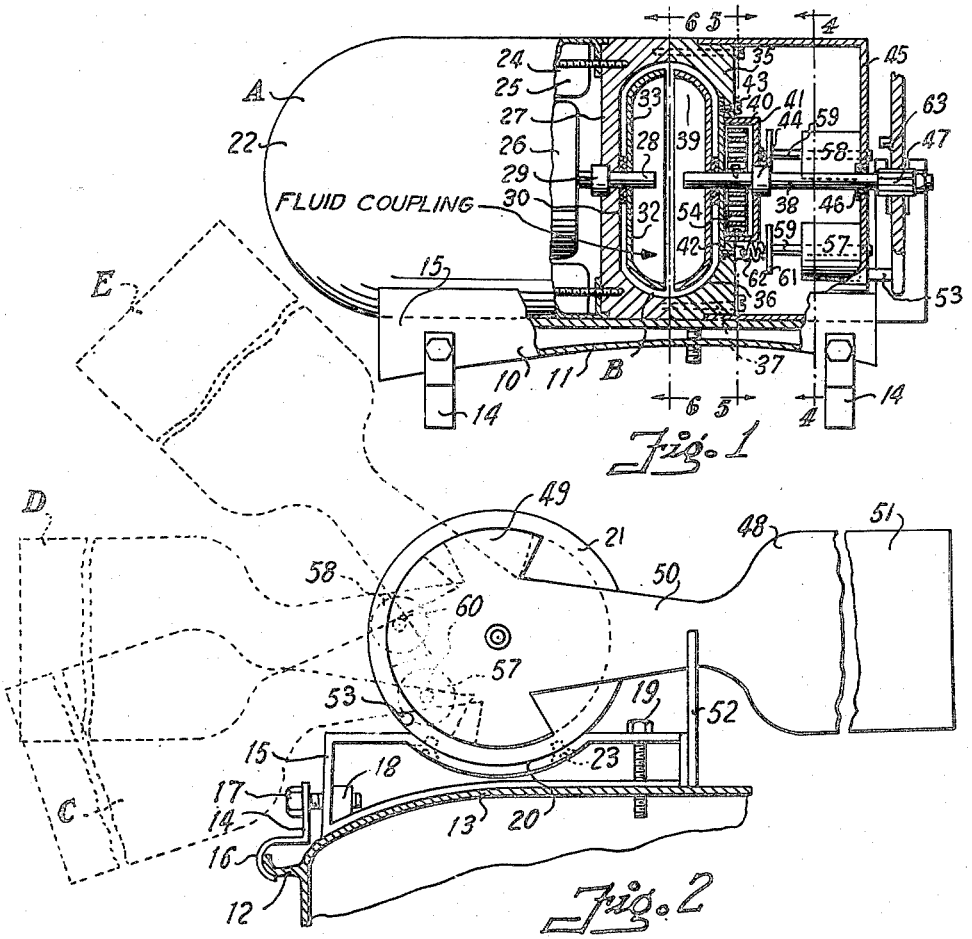
Fig. 1
Fig. 2
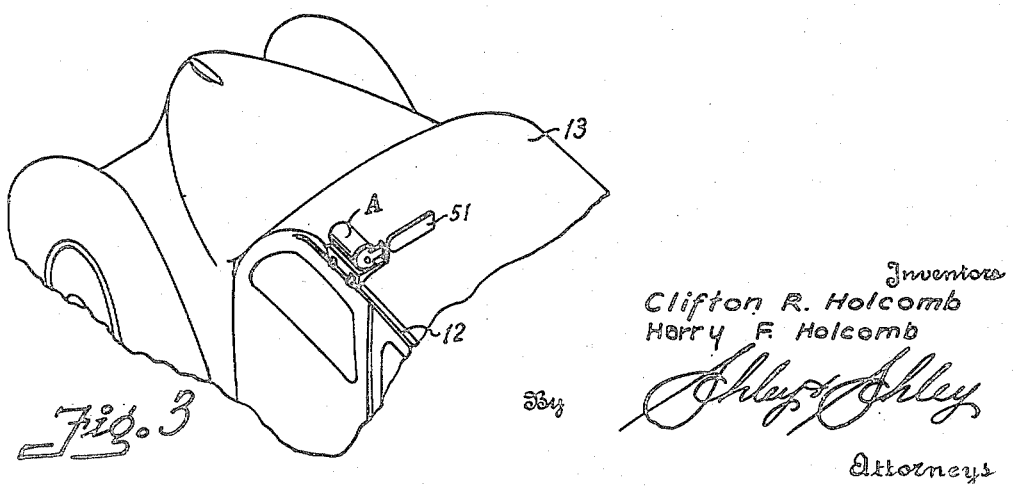
Fig. 3
Inventors
Clifton R. Holcomb
Harry F. Holcomb
Attorneys Aug. 1, 1950     C. R. HOLCOMB ET AL     2,517,314
SIGNALING DEVICE FOR AUTOMOBILES
Filed July 31, 1948     2 Sheets-Sheet 2
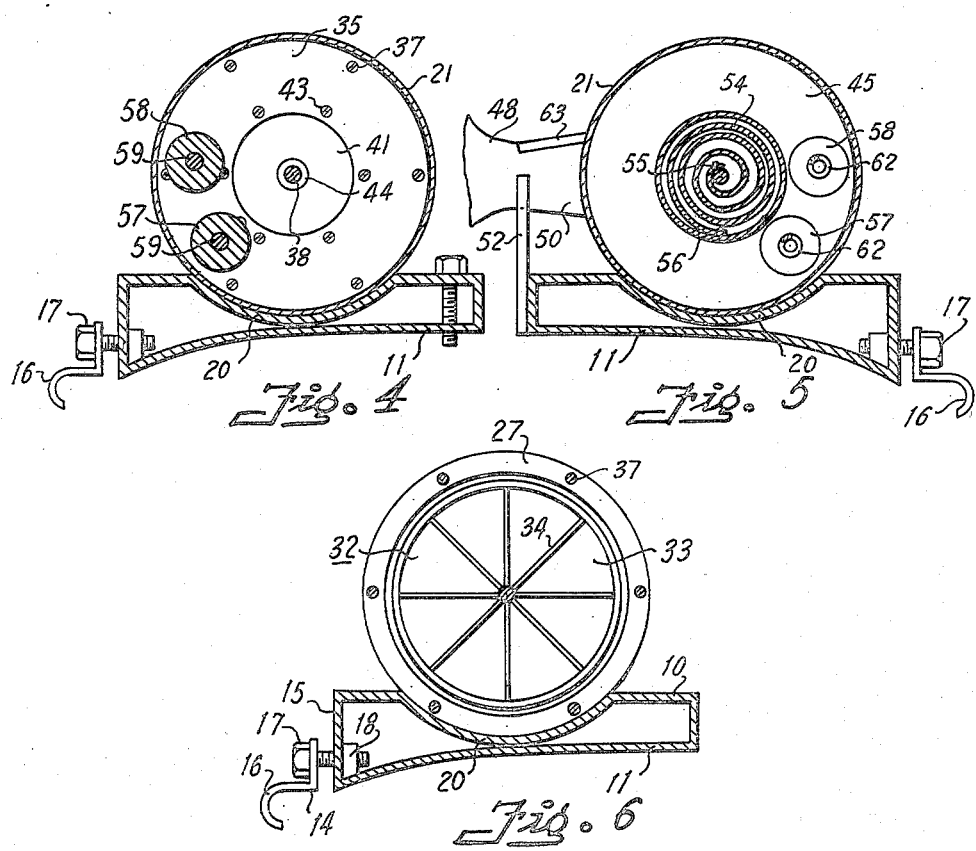
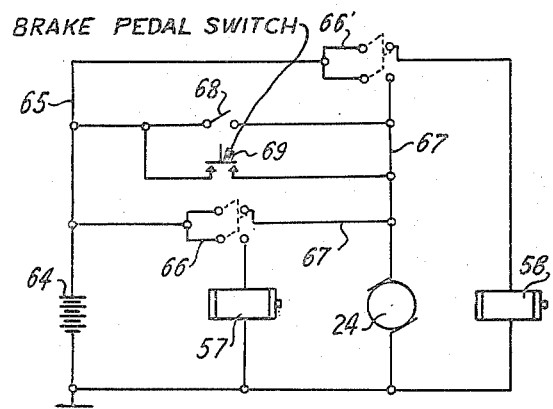
Inventors
Clifton R. Holcomb
Harry F. Holcomb
Attorneys Patented Aug. 1, 1950

2,517,314

UNITED STATES PATENT OFFICE 2,517,314

SIGNALING DEVICE FOR AUTOMOBILES

Clifton R. Holcomb, Tahlequah, and Harry F. Holcomb, Oklahoma City, Okla.

Application July 31, 1948, Serial No. 41,806

5 Claims. (Cl. 177—327)

This invention relates to new and useful improvements in signaling devices for automobiles.

One object of the invention is to provide an improved signaling device for automobiles which permits the operator of an automobile to give distinctive and prominent signals as to right and left hand turns, and the slowing or stopping of his vehicle.

A further object of the invention is to provide a signaling device of the character described which, when in operation, employs a continuously revolving electric motor which drives the signal arms through a fluid coupling.

Yet another object of the invention is to provide an improved signaling device for automobiles which is simple and compact in structure and may readily be attached to any desired type of automobile.

A still further object of the invention is to provide an improved signaling device of the character described which is adapted to be secured upon the top of an automobile where it is out of the way and does not impede normal use or operation of the automobile, and which is compact so as to be unobtrusive and neat in appearance.

A construction designed to carry out the invention will be hereinafter described together with other features of the invention.

The invention will be more readily understood from a reading of the following specification and by reference to the accompanying drawing wherein an example of the invention is shown, and wherein:

Fig. 1 is a side view of a signaling device constructed in accordance with this invention, the view being partly in elevation and partly in section to illustrate the structure, Fig. 2 is a rear elevation of the signaling device mounted upon a vehicle top, and illustrating the various positions of the signal arm, Fig. 3 is a fragmentary, isometric view of an automobile having the signaling device mounted thereon, Fig. 4 is a vertical, cross-sectional view taken upon the line 4—4 of Fig. 1, Fig. 5 is a vertical, cross-sectional view taken upon the line 5—5 of Fig. 1, Fig. 6 is a vertical, cross-sectional view taken upon the line 6—6 of Fig. 1, and Fig. 7 represents the wiring diagram for the signaling device.

In the drawings, the numeral 10 designates a hollow supporting base for the signaling device. Viewed from above, the base is substantially rectangular in outline, and is provided with a concave or dished-bottom 11 which is curved slightly upwardly in both its longitudinal and transverse axes so as to conform to the generally convex outline or configuration of the usual automobile top. Of course, the degree of curvature in both directions of the bottom 11 may vary in accordance with the vehicle upon which the device is to be mounted, and in accordance with the particular location upon said top where the signaling device is to be disposed. However, it has been found most desirable to secure the device upon the forward, left-hand portion of the vehicle top, immediately above the automobile door opening into the driver's seat, and the curvature of the bottom plate 11 should be such as to conform to this portion of the automobile top.

In Fig. 3, the signaling device, designated generally by the figure A, is illustrated as being secured in the aforesaid position upon the top of an automobile. Nearly all automobiles are provided with a small gutter or drain channel 12 which projects laterally from the side portions of the top 13 of the automobile and overlies the door openings of said automobile. For the purpose of securing the base 10 in position, a pair of clips 14 are secured upon the left-hand side wall 15 of said base. The clips 14 carry arcuate ears or hooks 16 which engage over, and partially beneath, the drain channel 12 to anchor the base against lateral and upward displacement. Suitable bolts 17 extend through the clips 14 and the side wall 15, and engage in bosses or thickened sections 18 provided upon the inner side of the wall 15, whereby said bolts may be tightened to clamp the base securely in position upon the automobile top. For further securing of the base to the automobile top, a bolt 19 extends vertically through the inner side or portion of the base 10, and is screwed into the material of the top 13. In this manner, the base is rigidly and securely mounted in the desired position upon the automobile top with only one opening, that for the bolt 19, being necessarily cut in said top.

A relatively large, semi-cylindrical pocket or recess 20 extends longitudinally of the upper side of the base 10 and receives a hollow, cylindrical housing 21 which encloses the driving motor and control mechanism for the signaling device. The forward end 22 of the housing is preferably hemispherical in outline to increase the streamlining of the housing and to enhance its appearance. It is obvious, however, that the housing may be made in any desirable or suitable shape so long as it may be secured upon the base 10 and will accommodate the necessary signaling mechanism. Short bolts 23 extend through the material of the base 10 into the shell of the housing 21 for securing said housing in place upon the base, and again, any desirable or suitable securing means may be used for the latter purpose.

The forward portion of the housing adjacent the rounded forward end 22 receives a suitable electric motor 24, and it is preferable that this portion of the housing form the shell or casing for said motor with the field coils 25 of the motor being secured directly to the inner wall of the housing, and the rotor 26 being suitably journaled within said housing for revolution within said field coils. A relatively thick, transverse partition 27 extends across the housing 21 rearwardly of the motor 24, and the shaft 28 of the motor extends rearwardly through said partition, being rotatably supported therein by a combination bearing and oil seal ring 29. A circular recess 30 is formed in the rearward face of the partition 27 concentrically with respect to the shaft 28, said recess having its marginal or peripheral portion curved radially outwardly and rearwardly with respect to the partition 27. A fluid coupling driving rotor or impeller 32 is disposed within the recess 30 and secured upon the projecting end of the shaft 28 which terminates slightly short of the rearward side of the rotor 32. The rotor is formed of a circular plate 33 having its peripheral portion curved outwardly and rearwardly so as to be complementary in outline to the shape of the recess 30. A plurality of radial vanes 34 are positioned perpendicularly to the plate 33 and extend radially outwardly from the shaft 28 to the curved marginal portion of said plate 33. Being secured upon the shaft 28, the impeller or rotor 32 is revolved whenever the motor 24 is operating.

A second partition 35, similar in shape to the partition 27, and carrying a forwardly facing recess 36, similar to the recess 30, is provided rearwardly of the partition 27, the peripheral portions of the partitions abutting one another and being secured together by suitable bolts 37 with any desired type of gasket or packing therebetween. With this structure, the recesses 30 and 36 coact to form a fluid coupling chamber B having the shape of a relatively flat cylinder with a rounded peripheral portion. A filler plug (not shown) may be provided at any suitable point to fill this chamber with hydraulic fluid. A driven shaft 38 extends axially of the recess 36 and has its opposite end projecting rearwardly from the partition 35. A fluid coupling driven element 39, similar to the impeller 32, is mounted upon the shaft 38 within the recess 36, the element 39 having its open side facing the open side of the impeller 32 for driving thereby. A large central opening 40 is cut in the partition 35 and receives a hollow cylindrical box 41 having an annular, outwardly extending flange 42 projecting from its forward wall. The flange 42 is countersunk into the bottom of the recess 36 and secured in position therein by short bolts 43 extending through the partition 35. The rearward portion of the housing 41 projects through the opening 40. A suitable bearing and oil seal ring 44 is mounted in the rearward wall of the housing 41 and aids in supporting the shaft 38.

The rearwardmost portion of the housing 21 provides an enclosure for the signal control elements and is secured in any desirable manner to the partition 35. The shaft 38 is axially alined with the shaft 28, but there is no physical connection between the two shafts. The chamber B is filled with a suitable hydraulic fluid, such as a light petroleum oil, the rotation of the impeller 32 acting through the medium of the oil within the chamber B to rotate the element 39 in the usual manner common to fluid couplings. The shaft 38 extends longitudinally of the rearward portion of the housing 21 and projects through the rearward wall 45 thereof, a suitable bearing 46 being provided in the wall 45 for rotatively supporting the rearward portion of shaft 38. A splined hub 47 is secured upon the shaft 38 rearwardly of the wall 45 and receives a signal arm 48, which is provided with a counterweighted hub 49 and a reduced shank 50 extending from said hub diametrically opposed to the counterweight thereof. A relatively long, rectangular flag 51 extends from the shank 50 and forms the signaling portion of the arm. It is obvious, that the flag may be painted in any suitable and distinctive color so as to attract attention, or it may be provided with suitable lights for night operation.

In its normal position, the arm 48 is retracted and extends substantially horizontally from the shaft 38 across the top 13 of the automobile so as to be pointing toward the right-hand side thereof. In this position, the arm is supported upon an upstanding fork 52 which is secured to the right-hand side of the base 10 and engages the reduced shank 50 of said arm. When the motor 24 is actuated, the impeller 32 is driven and by means of the hydraulic fluid within the chamber B, the element 39 and shaft 38 are driven. The rotation of the motor is counterclockwise as viewed from the rear, and this counterclockwise rotation of the motor results in counterclockwise rotation of the arm 48. Such rotation continues until the movement of the arm is stopped or impeded by suitable mechanism.

The three signaling positions of the arm are illustrated in dotted lines in Fig. 2, these positions corresponding to the universally accepted arm signals for automobile drivers. The lowermost position C, which indicates slowing down or stopping of the vehicle, is obtained by providing a pin 53 which is secured in the marginal portion of the rear wall 45 of the housing 21 and projects rearwardly therefrom so as to lie in the path of rotation of the arm 48. The pin 53 is positioned upon the lower and left-hand portion of the wall 45, as viewed from the rear, so as to permit the arm to swing downwardly in its counterclockwise rotation below a horizontal position, but preventing the arm from striking the top 13 or the drain channel 12 of the automobile body. Upon actuation of the device or the giving of this signal, the motor 24 starts, and, through the fluid coupling within the chamber B, rotates the arm 48 in a counterclockwise direction until said arm strikes the pin 53. The arm cannot revolve further and is held in this position by the pin. However, the motor continues to rotate and through the fluid coupling with the chamber B exerts a constant counterclockwise torque upon the shaft 38, thereby holding the arm against the pin 53.

A coiled spring 54 is positioned within the box 41 for returning the arm to its right-hand or retracted position. As illustrated in Fig. 5, the spring 54 is spiraled in a counterclockwise direction and has its inner end 55 secured to the shaft 38. The outer end 56 of the spring is secured to the inner marginal wall of the box 41. Thus, as the motor rotates the shaft 38 in its counterclockwise direction, the spring 54 is wound and energy is stored therein for returning the signal arm 48 to its retracted position. As soon as the power supply to the motor 24 is interrupted and the motor no longer exerts a counterclockwise torque upon the shaft 38, the spring 54 functions to revolve the shaft 38, and therefore the arm 48, in a clockwise direction and returns said arm to its retracted position wherein the shank 50 engages the upstanding fork 52. In each of the signaling operations described herein, the spring 54 functions to return the signal arm to its retracted or inactive position as soon as the power to the electric motor is shut off.

A pair of solenoid coils are mounted within the rearward portion of the housing 21, as best shown in Figs. 1 and 4, the lower coil 57 being utilized for left-hand turn signals, and the upper coil 58 being employed for the making of right-hand turn signals. The coils abut the rearward wall 45 and carry suitable plungers 59 which the coils are adapted to project rearwardly through openings 60 in said wall 45. The plungers 59 carry travel limiting flanges 61 upon their inner ends, and are constantly urged toward the partition 35 by suitable coil springs 62 extending between the caps 61 and the heads of the bolts 43. The solenoid coils 57 and 58 are of sufficient strength to overcome the force exerted by the springs 62 and project the plungers 59 rearwardly through the openings 60 when said coils are actuated by the application of a suitable electric current.

For coacting with the rearward ends of the plungers 59, the signal arm 48 carries a forwardly extending ear 63 along the upper edge of its reduced shank 50. The ear 63 thus extends from the signal arm toward the rearward wall 45 of the housing 21 and is adapted to engage the rearward ends of the plungers 59 when the latter are projected rearwardly by the coils 57 and 58.

The position of the arm 48 for a left-hand turn signal is illustrated in dotted lines at D in Fig. 2, and it will be noted that the radial disposition of the coil 57 is such as to position its plunger 59 in the proper location for engagement with the ear 63 when the arm 48 has been rotated in a counterclockwise direction to the horizontal plane extending to the left from the shaft 38. The projecting plunger 59 of the coil 57 thus functions in much the same manner as the pin 53 to position the arm 48 and to prevent its further rotation under the torque being exerted by the motor 24. Of course, as soon as the electrical power to the device is shut off, the coil 57 is deenergized and permits the retraction of its plunger 59, while the spring 54 functions to return the arm to its retracted position, shown in full lines in Fig. 2. In a similar fashion, the upper coil 58 is positioned so as to halt the counterclockwise rotation of the signal arm after it has reached the proper position, indicated in dotted lines at E in Fig. 2, for signaling a right-hand turn. In accordance with standard practice, this position is reached when the arm is projecting outwardly and upwardly to the left of the vehicle. Again, upon deactuation of the coil 58 and the motor 24, the plunger 59 of the coil 58 is retracted, and the spring 54 returns the signal arm to its retracted position.

The wiring diagram for achieving the selective operation of the signaling device is illustrated in Fig. 7, it being noted that other wiring arrangements may obviously be employed. The battery 64 of the automobile is grounded in the usual fashion and has a "hot" conductor 65 leading therefrom. A pair of double pole, single throw switches 66 and 66' are connected in parallel to the conductor 65, and one terminal of each of the switches 66 and 66' is connected by wires 67 to one side of the electric motor 24, the other side of the motor being grounded in the usual manner. The second terminal of the switch 66' is connected to the solenoid coil 58, and the second terminal of the switch 66 is connected to the solenoid coil 57. The opposite sides of both coils are grounded. With this structure, the switches 66 and 66' individually control the operation of the solenoid coils 57 and 58, but the closing of either of said switches results in actuation of the motor 24. A third switch 68, of the single pole, single throw variety, is connected between the conductor 65 and one of the wires 67, and the closing of this switch results in actuation of the motor 24 alone. If desired, the usual stop-light switch 69 which is to be found in nearly all modern automobiles, may also be connected between the conductor 65 and one of the wires 67 whereby the motor 24 is actuated at the same time as the stop-light (not shown) of the automobile.

In the operation of this signaling device, the switches 66, 66' and 68 are mounted within the driving compartment so as to be convenient to the operator of the automobile. When the driver intends to slow or stop the automobile, he may rely upon the previously existing switch 69, or he may employ the switch 68 to give such slowing or stopping signal. Upon closure of the switch 68, the motor 24 is placed in operation thereby causing the arm 48 to be rotated or revolved in a counterclockwise direction, as viewed from the rear of the vehicle. Since neither of the coils 57 and 58 have been actuated, the rotation of the arm continues until it engages the pin 53 which holds the arm in position C (Fig. 2) indicating for the benefit of following vehicles an intention to slow or stop. The switch 68 will remain closed until opened by the driver, and the motor 24 will continue to revolve thereby exerting a continuous counterclockwise torque upon the shaft 38 and the arm 48 by means of the fluid coupling within the chamber B. This continued rotation of the motor is possible by reason of the fact that the impeller 32 may slip or rotate with respect to the element 39. Thus, a constant torque is exerted even though the shaft 38 is held against movement, and the motor 24 may continue to revolve and will not be harmed due to blockage of its rotative movement.

When the driver of the automobile wishes to terminate the stop signal being given, he opens the switch 68 which causes the motor 24 to cease operating and permits the spring 54 to return the arm 48 to its retracted position. This reverse revolution of the arm is again made possible through the slippage of the fluid coupling. It is pointed out that the stop light switch 69 is normally of the spring-pressed type, and is closed only when the brake pedal is depressed. Thus, when the switch 69 is relied upon to give the stop signal, such signal is effectuated so long as the brake pedal is depressed, but the signal arm is automatically retracted as soon as the brake pedal is released. Thus, when it is desired to give a continuous stop signal regardless of depression or release of the brake pedal of the automobile, the switch 68 is preferably employed.

When the driver of the automobile desires to give either a left-hand or a right-hand turn signal, he closes either the switch 66' or the switch 66. The closing of the switch 66' energizes the solenoid coil 58 so as to project the plunger 59 of that coil rearwardly from the plate 45 into the path of rotation of the ear 63. At the same time, the motor 24 is actuated to rotate the signal arm 48 until the ear 63 engages the projected pin 59. The signal arm is now in the position E (Fig. 2) indicating to following vehicles the intention to make a right-hand turn. Again, when the switch 66' is opened, the signal arm is automatically returned to its retracted position. In a similar fashion, the closing of the switch 66 energizes the solenoid coil 57 and brings the signal arm into the position D (Fig. 2) indicating a prospective left-hand turn.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A signaling device for automobiles including, an elongate cylindrical housing, an electric motor, one end of the housing forming a casing for the motor, said motor having a shaft extending longitudinally of the housing, an indicator arm shaft extending through the opposite end of the housing and having a portion projecting therefrom, an indicator arm carried upon the projecting portion of the latter shaft, and a yieldable driving connection in the housing between the motor shaft and the indicator arm shaft.

2. A signaling device as set forth in claim 1, wherein the motor shaft and the indicator arm shaft are axially alined.

3. A signaling device as set forth in claim 1, elements carried within the housing and adapted to be projected therefrom into the path of rotation of the indicator arm, and electro-magnetic means for projecting said elements from the housing.

4. A signaling device as set forth in claim 1, and a convolute spring within the housing encircling the indicator arm shaft and affixed thereto, the free outer end of the spring being connected to the housing so as to tend to revolve the indicator arm shaft in a direction opposite to that in which said arm is revolved by the motor.

5. A signaling device for automobiles including, an electric motor having a housing and a motor shaft, means for mounting the motor upon an automobile with the motor shaft substantially parallel to the longitudinal axis of the automobile, the motor housing being extended from one end of the motor, an indicator arm shaft in the extended portion of the housing in axial alinement with the motor shaft and projecting from the housing, an indicator arm carried by the projecting portion of the latter shaft, a fluid coupling in the extended portion of the housing between the motor shaft and the indicator arm shaft connected to said shafts, and a spring connected between the housing and the indicator arm shaft resisting revolution of the latter shaft through the fluid coupling.

CLIFTON R. HOLCOMB.
HARRY F. HOLCOMB.

REFERENCES CITED

The following references are of record in the file of this patent:

UNITED STATES PATENTS

| Number | Name | Date |
|---|---|---|
| 1,472,186 | Morris | Oct. 30, 1923 |
| 1,654,943 | Nott | Jan. 3, 1928 |
| 1,669,597 | Burson et al. | May 14, 1928 |
| 1,737,631 | Anderson | Dec. 3, 1929 |
| 2,004,289 | Martinez | June 11, 1935 |